United States Patent [19]

Hasegawa et al.

[11] Patent Number: 5,081,650
[45] Date of Patent: Jan. 14, 1992

[54] DATA RECEIVER

[75] Inventors: Makoto Hasegawa, Tokyo; Motoi Ohba; Mitsuo Makimoto, both of Yokohama, Japan

[73] Assignee: Matsushita Electric Industrial Co., Ltd., Osaka, Japan

[21] Appl. No.: 543,490

[22] Filed: Jun. 26, 1990

[30] Foreign Application Priority Data

Jul. 12, 1989 [JP] Japan ................................ 1-181119
Sep. 14, 1989 [JP] Japan ................................ 1-238521

[51] Int. Cl.⁵ .......................................... H04L 27/14
[52] U.S. Cl. ............................. 375/80; 329/302; 329/303; 375/82
[58] Field of Search ............... 375/77, 80, 81, 82, 375/83, 88, 90; 455/324; 329/300, 301, 302, 303, 304, 306, 309, 310

[56] References Cited

U.S. PATENT DOCUMENTS

| 4,156,194 | 5/1979 | Mueller | 329/302 |
| 4,462,107 | 7/1984 | Vance | 375/88 |
| 4,518,922 | 5/1985 | Luecke | 329/302 |
| 4,752,742 | 6/1988 | Akaiwa | 329/302 |
| 4,870,659 | 9/1989 | Oishi et al. | 329/303 |

Primary Examiner—Benedict V. Safourek
Attorney, Agent, or Firm—Pollock, VandeSande & Priddy

[57] ABSTRACT

A data receiver includes first and second mixers mixing an input RF signal and a local oscillator signal and generating first and second quadrature baseband-frequency output signals. A phase shifter shifts a phase of the first baseband-frequency output signal by 90 degrees. A third mixer mixes an output signal from the phase shifter and the first baseband-frequency output signal. A fourth mixer mixes the first and second baseband-frequency output signals. A demodulator performs data demodulation by use of output signals from the third and fourth mixers.

18 Claims, 9 Drawing Sheets

DATA RECEIVER

BACKGROUND OF THE INVENTION

1. Field of the Invention

This invention generally relates to a data receiver, and specifically relates to a radio receiver for frequency shift keyed (FSK) signals representing data.

2. Description of the Prior Art

In some cases, data transmission is made via radio communication equipments which use data-representing FSK signals on a radio frequency (RF) carrier.

U.S. Pat. No. 4,462,107 corresponding to Japanese published unexamined patent application 58-19038 discloses a direct-conversion radio receiver for FSK signals which includes a pair of signal paths having respective mixers. Quadrature outputs of these mixers are low-pass filtered, and a 90-degree phase shift at a base band frequency is introduced in one signal path. The base band signals are then fully limited and applied to a logic network to provide a digital output indicative of the relative lead/lag condition of the two signal paths.

In the radio receiver of U.S. Pat. No. 4,462,107, the digital output tends to be contaminated by errors at considerable rates as the frequency of a local oscillator signal deviates from the frequency of the RF carrier.

SUMMARY OF THE INVENTION

It is an object of this invention to provide an excellent data receiver.

According to a first aspect of this invention, a data receiver comprises a pair of first and second mixers mixing an input RF signal and a local oscillator signal and generating a pair of first and second quadrature baseband-frequency output signals; a phase shifter shifting a phase of the first baseband-frequency output signal by 90 degrees; a third mixer mixing an output signal from the phase shifter and the first baseband-frequency output signal; a fourth mixer mixing the first and second baseband-frequency output signals; and a demodulator performing data demodulation by use of output signals from the third and fourth mixers.

According to a second aspect of this invention, a data receiver comprises a pair of first and second mixers mixing an input RF signal and a local oscillator signal and generating a pair of first and second quadrature baseband-frequency output signals; means for branching the first baseband-frequency output signal into first and second parts; a third mixer mixing the first and second parts of the first baseband-frequency output signals; a fourth mixer mixing the first and second baseband-frequency output signals; a phase shifter shifting a phase of an output signal from the third mixer by 90 degrees; a fifth mixer mixing an output signal from the phase shifter and the output signal from the third mixer; a sixth mixer mixing the output signal from the third mixer and an output signal from the fourth mixer; and a demodulator performing data demodulation by use of output signals from the fifth and sixth mixers.

According to a third aspect of this invention, a data receiver comprises a pair of first and second mixers mixing an input RF signal and a local oscillator signal and generating a pair of first and second quadrature baseband-frequency output signals; a first phase shifter shifting a phase of the second baseband-frequency output signal by 90 degrees; a third mixer mixing the first baseband-frequency output signal and an output signal from the first phase shifter; a fourth mixer mixing the second baseband-frequency output signal and the output signal from the first phase shifter; a second phase shifter shifting a phase of an output signal from the third mixer by 90 degrees; a fifth mixer mixing an output signal from the second phase shifter and the output signal from the third mixer; a sixth mixer mixing the output signal from the third mixer and an output signal from the fourth mixer; and a demodulator performing data demodulation by use of output signals from the fifth and sixth mixers.

According to a fourth aspect of this invention, a data receiver for an RF FSK signal containing data comprises means for generating a pair of first and second quadrature baseband-frequency signals on the basis of the RF FSK signal; means for converting the pair of the first and second baseband-frequency signals into a pair of third and fourth quadrature baseband-frequency signals, wherein the third and fourth baseband-frequency signals have a frequency which essentially equals a predetermined multiple of a frequency of the first and second baseband-frequency signals; and means for recovering the data from the third and fourth baseband-frequency signals.

According to a fifth aspect of this invention, a data receiver comprises a pair of first and second mixers mixing an input RF signal and a local oscillator signal and generating a pair of first and second quadrature baseband-frequency output signals; means for generating a clock signal on the basis of the first baseband-frequency output signal, wherein the clock signal has a frequency essentially twice a frequency of the first baseband-frequency output signal and has a predetermined phase offset with respect to the first baseband-frequency output signal; a first D-type flip-flop having a D input terminal subjected to the first baseband-frequency output signal and a clock input terminal subjected to the clock signal; a second D-type flip-flop having a D input terminal subjected to the second baseband-frequency output signal and a clock input terminal subjected to the clock signal; and a third mixer mixing output signals from the first and second flip-flops.

According to a sixth aspect of this invention, a data receiver for an RF FSK signal containing data comprises means for generating a pair of first and second quadrature baseband-frequency signals on the basis of the RF FSK signal; means for generating a clock signal which has predetermined phase offsets with respect to the first and second baseband-frequency signals respectively; means for sampling the first baseband-frequency signal in response to the clock signal to convert the first baseband-frequency signal into a corresponding first sample signal; means for sampling the second baseband-frequency signal in response to the clock signal to convert the second baseband-frequency signal into a corresponding second sample signal; and means for recovering the data from the first and second sample signals.

DESCRIPTION OF THE FIRST PREFERRED EMBODIMENT

Figure 1:
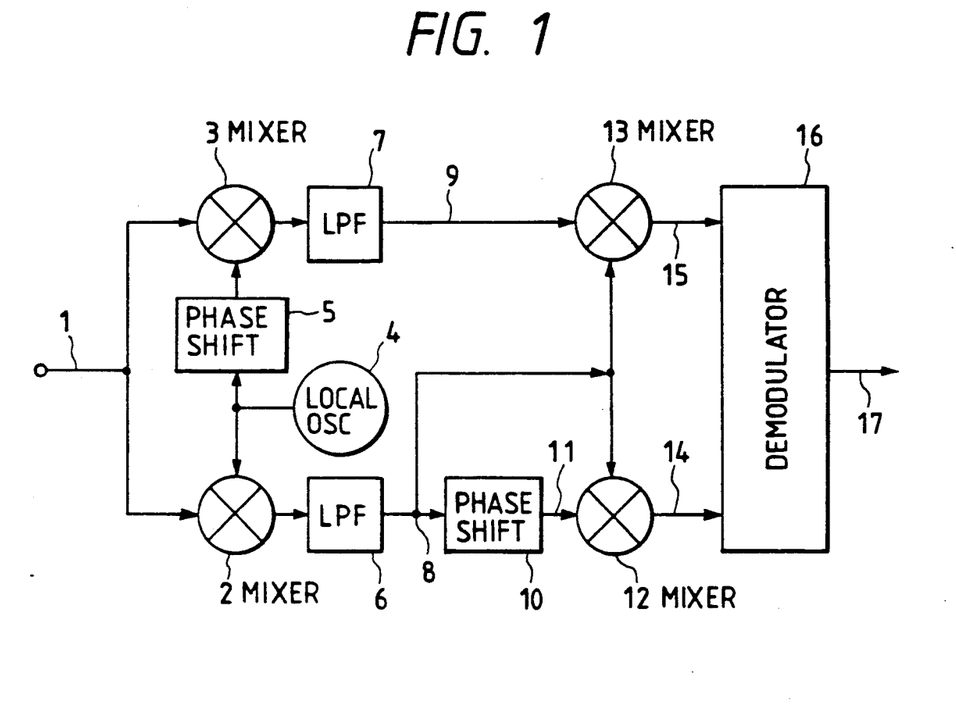
FIG. 1 is a block diagram of a data receiver according to a first embodiment of this invention.

With reference to FIG. 1, an input RF signal 1 is directly applied to a pair of mixers 2 and 3. The input RF signal 1 contains FSK signals on an RF carrier. Specifically, the input RF signal 1 has frequencies $fc \pm \delta$ where fc is the carrier frequency and $\delta$ is the FSK modulation deviation (the modulation frequency). A local oscillator 4 generates a signal corresponding to the RF carrier. The output signal from the local oscillator 4 is directly applied to the mixer 2. The output signal from the local oscillator 4 is transmitted via a 90-degree phase shifter 5 to the mixer 3. In this way, the mixers 2 and 3 are subjected to a pair of quadrature local oscillator signals respectively. The mixer 2 mixes the input RF signal 1 and one of the quadrature local oscillator signals. The mixer 3 mixes the input RF signal 1 and the other quadrature local oscillator signal.

The output signal of the mixer 2 is passed through a low pass filter 6, and thereby an in-phase baseband-frequency (or audio-frequency) signal 8 is extracted from the output signal of the mixer 2. The in-phase baseband-frequency signal is shortened to "the I signal". The output signal of the mixer 3 is passed through a low pass filter 7, and thereby a quadrature-phase baseband-frequency (or audio-frequency) signal 9 is extracted from the output signal of the mixer 3. The quadrature-phase baseband-frequency signal is shortened to "the Q signal".

The I signal 8 is applied to a pair of mixers 12 and 13. The I signal 8 is inputted into a 90-degree phase shifter 10 and is subjected by the device 10 to a 90-degree phase shift process. The output signal 11 of the phase shifter 10 is applied to the mixer 12. The mixer 12 mixes the I signal 8 and the output signal 11 of the phase shifter 10, generating a signal 14 to be exposed to demodulation. The Q signal 9 is applied to the mixer 13. The mixer 13 mixes the I signal 8 and the Q signal 9, generating a signal 15 to be exposed to demodulation. The signals 14 and 15 are fed to a demodulator 16. Demodulator output data 17 are generated by the demodulator 16 on the basis of the signals 14 and 15.

Figure 2:
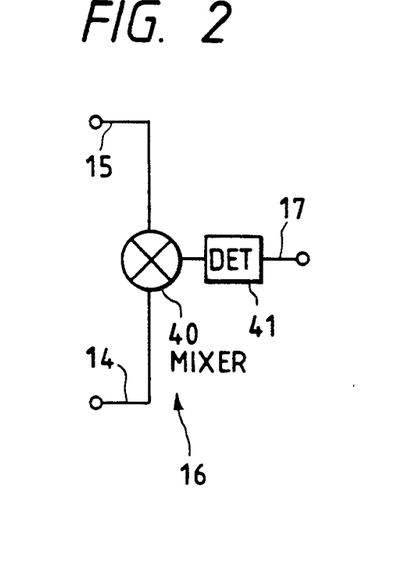
FIG. 2 is a block diagram of the demodulator in FIG. 1.

As shown in FIG. 2, the demodulator 16 includes a mixer 40 receiving and mixing the signals 14 and 15 which are outputted from the mixers 12 and 13 (see FIG. 1). The phase relation between the signals 14 and 15 changes between a same-phase state and an opposite-phase state in accordance with the state of the data on the input RF signal 1. Accordingly, the sign or polarity of the output baseband-frequency signal from the mixer 40 changes in correspondence with the state of the data. The demodulator 16 also includes a detector 41 receiving the output signal of the mixer 40. The detector 41 recovers the data signal 17 from the output signal of the mixer 40.

The I signal 8 and the Q signal 9 are expressed by the following equations.

$$I \text{ signal} = \cos[2\pi(\delta \pm \Delta f)t \pm \theta 1]$$

$$Q \text{ signal} = \pm \sin[2\pi(\delta \pm \Delta f)t \pm \theta 1 \mp \theta 2]$$

where $\Delta f$ denotes the difference between the frequency of the carrier of the input RF signal 1 and the frequency of the output signal of the local oscillator 4; $\theta 1$ denotes the difference between the phase of the carrier of the input RF signal 1 and the phase of the output signal of the local oscillator 4; $\theta 2$ denotes a phase error of the phase shifter 5; and $\delta$ denotes the modulation frequency. The I signal 8 is free from any phase inversion responsive to a change in the sign of the modulation frequency. The Q signal 9 exhibits a phase inversion responsive to a change in the sign of the modulation frequency, and thus has information representing the transmitted data. The I signal 8 and the Q signal 9 have substantially a quadrature relation.

The output signal 14 from the mixer 12 is free from any phase inversion responsive to a change in the sign of the modulation frequency, and has a frequency essentially twice the modulation frequency. The output signal 15 from the mixer 13 exhibits a phase inversion responsive to a change in the sign of the modulation frequency, and thus has information representing the transmitted data. The output signal 15 from the mixer 13 has a frequency essentially twice the modulation frequency. Specifically, the frequency of the output signals 14 and 15 from the mixers 12 and 13 is expressed as "$2(\delta \pm \Delta f)$".

In a prior art case where baseband-frequency output signals exposed to demodulation have a frequency "$(\delta \pm \Delta f)$", errors tend to occur at considerable rates in data demodulation related to the frequency "$(\delta \pm \Delta f)$" when the frequency error $\Delta f$ is large so that the frequency "$(\delta \pm \Delta f)$" is low.

In the embodiment of this invention, errors occur at lower rates than those of the prior art case in data demodulation when the frequency error $\Delta f$ is large. This is because the frequency of the baseband-frequency signals 14 and 15 in the embodiment of this invention is equal to twice the frequency of the baseband-frequency output signals in the prior art case.

A phase relation between the output signals 14 and 15 from the mixers 12 and 13 changes between a same-phase state and an opposite-phase state in response to the state of the transmitted data. Accordingly, the original data can be easily recovered by the demodulator 16 on the basis of the output signals 14 and 15 from the mixers 12 and 13.

This embodiment may be modified by exchanging the I signal 8 and the Q signal 9. Specifically, in the modification, the I signal 8 is applied to the mixer 13 while the Q signal 9 is applied to the mixers 12 and 13 and the phase shifter 10.

DESCRIPTION OF THE SECOND PREFERRED EMBODIMENT

Figure 3:
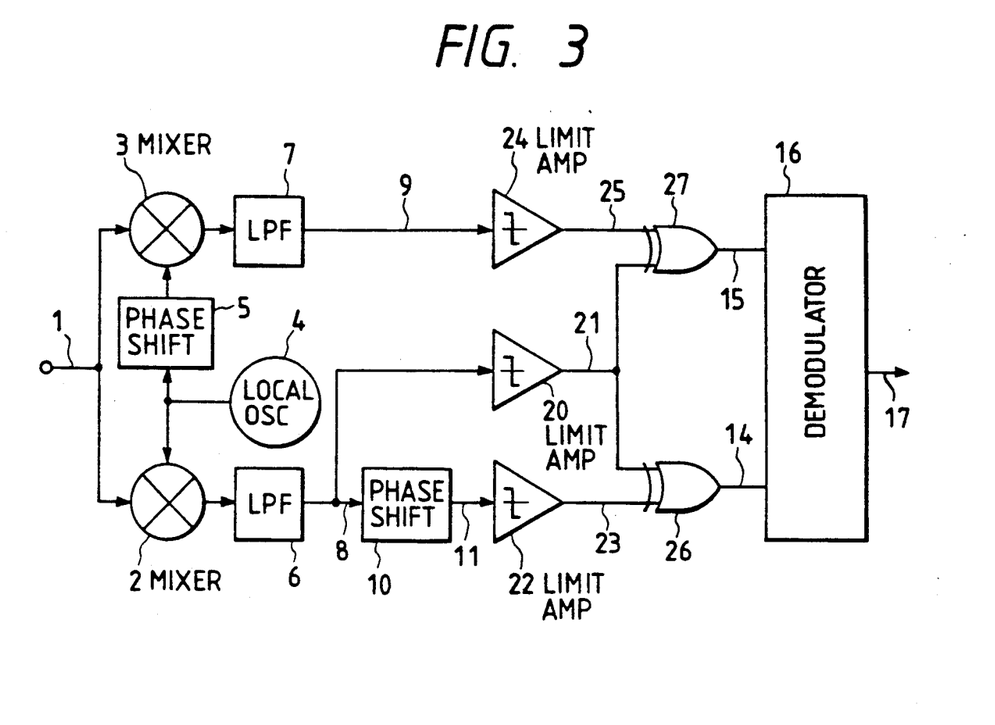
FIG. 3 is a block diagram of a data receiver according to a second embodiment of this invention.

FIG. 3 shows a second embodiment of this invention which is similar to the embodiment of FIGS. 1 and 2 except for design changes indicated later. The second embodiment will now be explained with reference to FIGS. 3-5.

Figure 4:
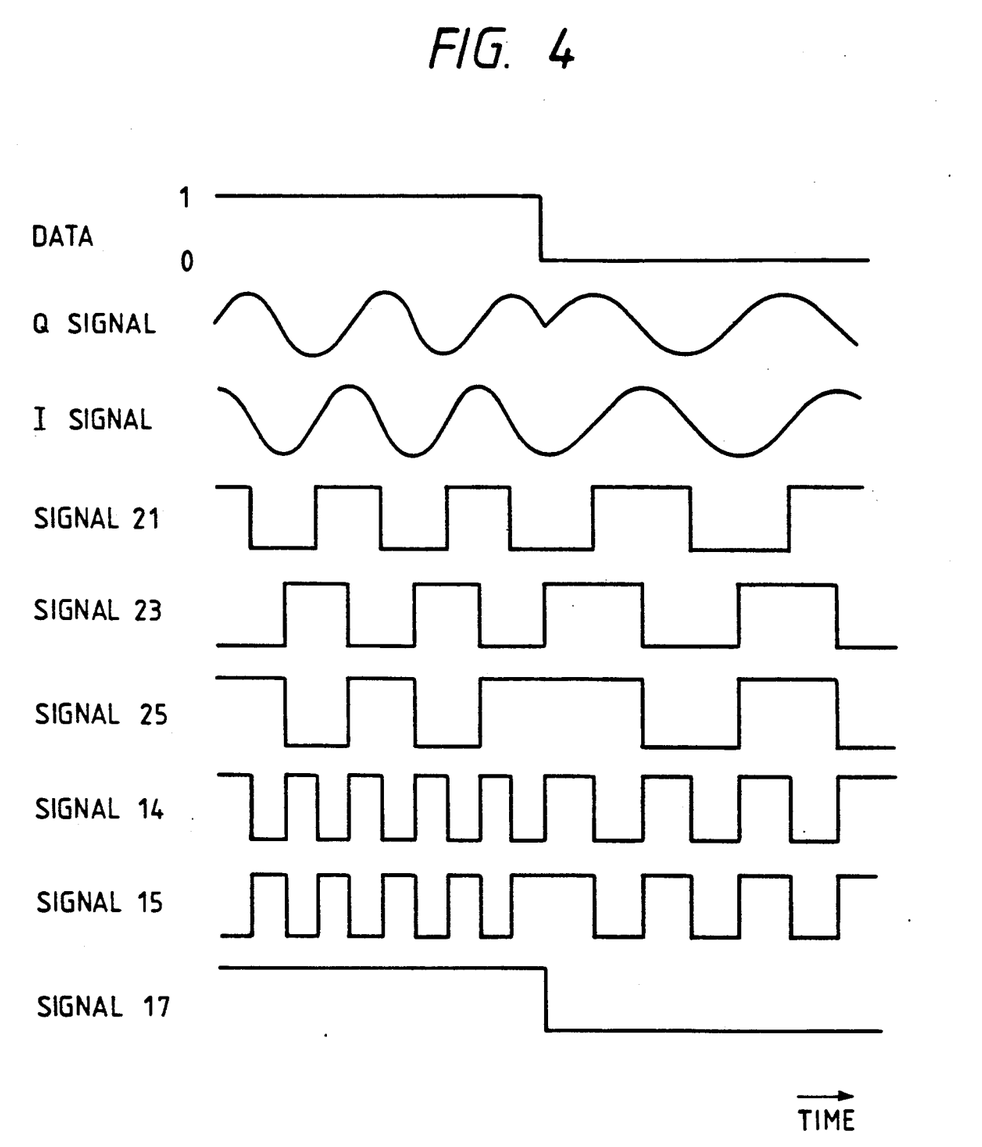
FIG. 4 is a timing diagram showing the waveforms of various signals in the data receiver of FIG. 3.

As shown in FIG. 4, both the frequencies of the I signal 8 and the Q signal 9 change when data on the input RF signal 1 changes between "0" and "1". In the shown case, since the data "0" is designed so as to correspond to "$\delta - \Delta f$", the frequencies of the I signal 8 and the Q signal 9 decrease when the data changes from "1" to "0". The I signal 8 is free from any phase inversion responsive to a change of the data. The Q signal 9 changes in phase upon a change of the data.

As shown in FIG. 3, the I signal 8 is applied to a limiting amplifier 20, and the I signal 8 is shaped by the limiting amplifier 20 into a corresponding binary signal 21 (see FIG. 4). The output signal 21 from the limiting amplifier 20 is applied to a first input terminal of an EXCLUSIVE-OR gate 26. The output signal 11 of a phase shifter 10 is applied to a limiting amplifier 22, and the signal 11 is shaped by the limiting amplifier 22 into a corresponding binary signal 23 (see FIG. 4). The output signal 23 from the limiting amplifier 22 is applied to a second input terminal of the EXCLUSIVE-OR gate 26. The EXCLUSIVE-OR gate 26 generates a signal 14 on the basis of the output signals 21 and 23 from the limiting amplifiers 20 and 22. As shown in FIG. 4, the signal 14 has a bit rate or a pulse frequency twice that of the signals 21 and 23. The signal 14 is free from any phase inversion responsive to a change of the data.

The Q signal 9 is applied to a limiting amplifier 24, and the Q signal 9 is shaped by the limiting amplifier 24 into a corresponding binary signal 25 (see FIG. 4). The output signal 25 from the limiting amplifier 24 is applied to a first input terminal of an EXCLUSIVE-OR gate 27. The output signal 21 from the limiting amplifier 20 is applied to a second input terminal of the EXCLUSIVE-OR gate 27. The EXCLUSIVE-OR gate 27 generates a signal 15 on the basis of the output signals 21 and 25 from the limiting amplifiers 20 and 25. As shown in FIG. 4, the signal 15 has a bit rate or a pulse frequency twice that of the signals 21 and 25. The signal 15 exhibits a phase inversion responsive to a change of the data.

As shown in FIG. 4, the phase relation between the signals 14 and 15 changes between a same-phase state and an opposite-phase state in accordance with the state of the data. As shown in FIG. 3, these signals 14 and 15 are fed to a demodulator 16. Demodulator output data 17 are generated by the demodulator 16 on the basis of the signals 14 and 15.

Figure 5:
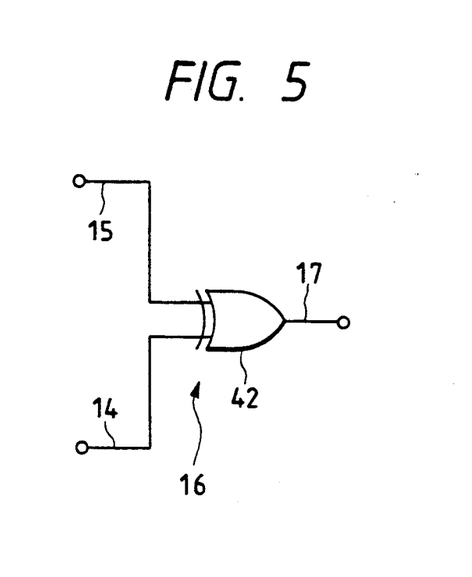
FIG. 5 is a block diagram of the demodulator in FIG. 3.

As shown in FIG. 5, the demodulator 16 includes an EXCLUSIVE-OR gate 42 receiving the signals 14 and 15. As described previously, the phase relation between the signals 14 and 15 changes between a same-phase state and an opposite-phase state in accordance with the state of the data on the input RF signal 1. Accordingly, the EXCLUSIVE-OR gate 42 easily recovers the data signal 17 on the basis of the signals 14 and 15.

In cases where the EXCLUSIVE-OR gate 42 generates noise pulses, a data filter or a low pass filter may follow the EXCLUSIVE-OR gate 42 to remove these noise pulses.

This embodiment may be modified by exchanging the I signal 8 and the Q signal 9. Specifically, in the modification, the I signal 8 is applied to the limiting amplifier 24 while the Q signal 9 is applied to the limiting amplifier 20 and the phase shifter 10.

DESCRIPTION OF THE THIRD PREFERRED EMBODIMENT

Figure 6:
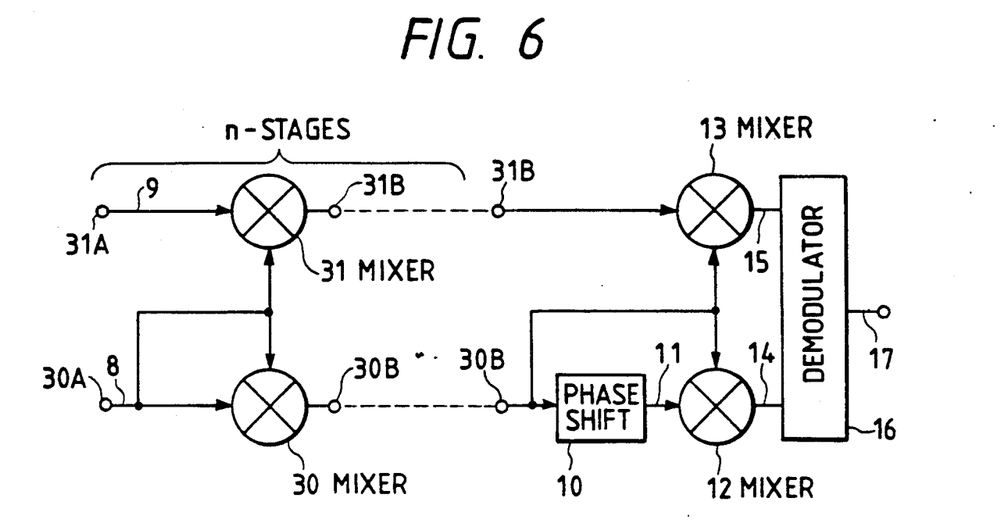
FIG. 6 is a block diagram of a part of a data receiver according to a third embodiment of this invention.

FIG. 6 shows a third embodiment of this invention which is similar to the embodiment of FIGS. 1 and 2 except for design changes indicated hereinafter.

The embodiment of FIG. 6 includes "n" stages of mixing sections connected in cascade and having equal designs, where "n" denotes a predetermined integer equal to or greater than 1.

Each of the mixing sections has input terminals 30A and 31A, mixers 30 and 31, and output terminals 30B and 31B. In each of the mixing sections, both input terminals of the mixer 30 are connected to the mixing section input terminal 30A, and input terminals of the mixer 31 are connected to the mixing section input terminals 30A and 31A respectively. In addition, the output terminals of the mixers 30 and 31 are connected to the mixing section output terminals 30B and 31B respectively.

The input terminals 30A and 31A of the first mixing section receive the I signal 8 and the Q signal 9 respectively. The mixers 30 and 31 of the first mixing section generate a pair of quadrature signals on the basis of the I signal 8 and the Q signal 9. These quadrature signals have frequencies essentially twice the frequencies of the I signal 8 and the Q signal 9. One of the quadrature signals is free from any phase inversion responsive to a change of the data. The other quadrature signal exhibits a phase inversion responsive to a change of the data. The output terminals 30B and 31B of the first mixing section are connected to the input terminals 30A and 31A of the second mixing section respectively. The quadrature signals generated by the mixers 30 and 31 of the first mixing section are transmitted via the output terminals 30B and 31B of the first mixing section to the input terminals 30A and 31A of second mixing section respectively.

The second mixing section generates a pair of quadrature signals on the basis of the input signals. These quadrature signals have frequencies essentially twice the frequencies of the input signals. One of the quadrature signals is free from any phase inversion responsive to a change of the data. The other quadrature signal exhibits a phase inversion responsive to a change of the data. The output terminals 30B and 31B of the second mixing section are connected to the input terminals 30A and 31A of the third mixing section respectively. The quadrature signals generated by the second mixing section are transmitted via the output terminals 30B and 31B of the second mixing section to the input terminals 30A and 31A of the third mixing section. The third and later mixing sections operate similarly to the second mixing section. The third and later intermediate mixing sections are connected to the respective subsequent mixing sections similarly to the connection of the second mixing section to the third mixing section.

The output terminal 30B of the final mixing section is connected to a phase shifter 10 and a mixer 12. Thus, one of the quadrature signals generated by the final mixing section is applied to the phase shifter 10 and the mixer 12. The output terminal 31B of the final mixing section is connected to a mixer 13. Thus, the other quadrature signal generated by the final mixing section is applied to the mixer 13.

The quadrature signals generated by the final mixing section have frequencies equal to the frequencies of the I signal 8 and the Q signal 9 multiplied by an integer corresponding to $2^n$ where "n" denotes the stage number of the cascade combination of the mixing sections. The increase in the frequencies of the quadrature signals reduces the number of errors which occur in data demodulation.

DESCRIPTION OF THE FOURTH PREFERRED EMBODIMENT

Figure 7:
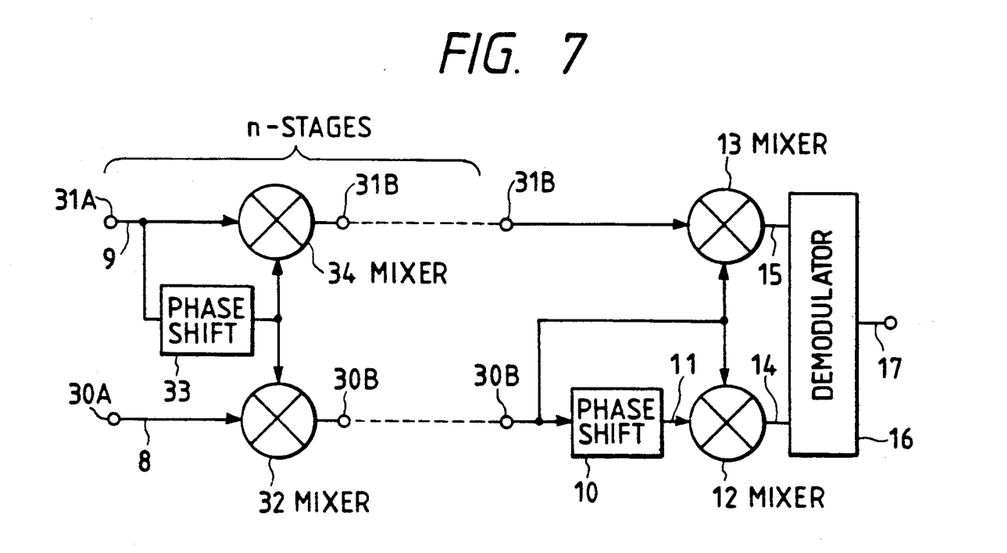
FIG. 7 is a block diagram of a part of a data receiver according to a fourth embodiment of this invention.

FIG. 7 shows a fourth embodiment of this invention which is similar to the embodiment of FIG. 6 except for the internal design of each of the mixing sections. In the embodiment of FIG. 7, each of the mixing sections has input terminals 30A and 31A, mixers 32 and 34, a 90-degree phase shifter 33, and output terminals 30B and 31B. In each of the mixing sections, the mixing section input terminal 30A is connected to a first input terminal of the mixer 32, and the mixing section input terminal 31A is connected to a first input terminal of the mixer 34 and the input terminal of the phase shifter 33. The output terminal of the phase shifter 33 is connected to second input terminals of the mixers 32 and 34. The output terminals of the mixers 32 and 34 are connected to the mixing section output terminals 30B and 31B respectively. Each of the mixing sections operates similarly to that in the embodiment of FIG. 6.

DESCRIPTION OF THE FIFTH PREFERRED EMBODIMENT

Figure 8:
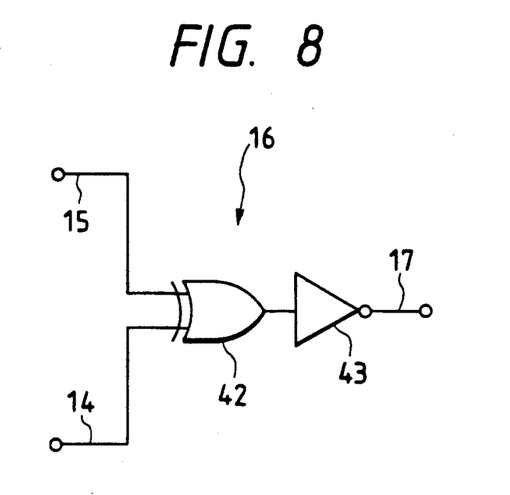
FIG. 8 is a block diagram of a demodulator in a fifth embodiment of this invention.

FIG. 8 shows a fifth embodiment of this invention which is similar to the embodiment of FIGS. 3-5 except for the demodulator 16. In the embodiment of FIG. 8, the demodulator 16 additionally includes an inverter 43 following the EXCLUSIVE-OR gate 42. This embodiment is effective in cases where the output data signal from the EXCLUSIVE-OR gate 42 is opposite in phase to the transmitted data.

DESCRIPTION OF THE SIXTH PREFERRED EMBODIMENT

Figure 9:
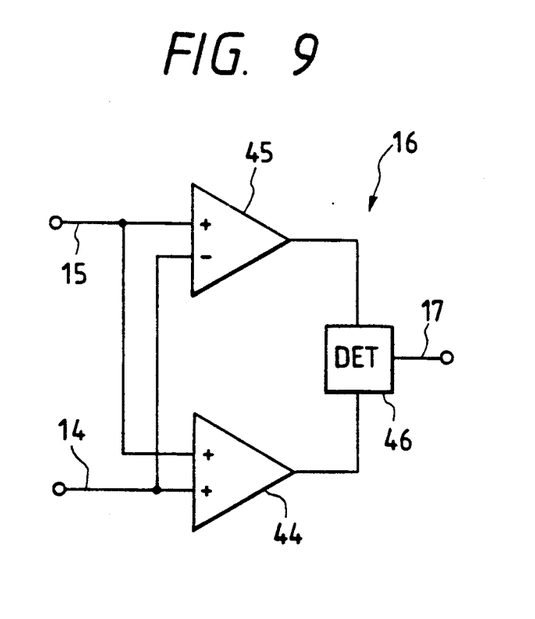
FIG. 9 is a block diagram of a demodulator in a sixth embodiment of this invention.

FIG. 9 shows a sixth embodiment of this invention which is similar to the embodiment of FIGS. 1 and 2 except for the demodulator 16. In the embodiment of FIG. 9, the demodulator 16 includes an adding amplifier 44, a subtracting amplifier 45, and a detector 46. Input terminals of the adding amplifier 44 receive the signals 14 and 15 from the mixers 12 and 13 (see FIG. 1) respectively. The adding amplifier 44 outputs a signal corresponding to addition between the signals 14 and 15. The output signal from the adding amplifier 44 is applied to the detector 46. Input terminals of the subtracting amplifier 45 receive the signals 14 and 15 from the mixers 12 and 13 (see FIG. 1) respectively. The subtracting amplifier 45 outputs a signal corresponding to subtraction between the signals 14 and 15. The output signal from the subtracting amplifier 45 is applied to the detector 46. The detector 46 combines the output signals from the amplifiers 44 and 45 and performs a detecting process, generating a data signal 17 on the basis of the output signals from the amplifiers 44 and 45.

As described previously, the phase relation between the signals 14 and 15 changes between a same-phase state and an opposite-phase state in accordance with the state of data. Thus, the output signal from the adding amplifier 44 will be essentially present and absent in accordance with the state of the data. Similarly, the output signal from the subtracting amplifier 45 will be essentially present and absent in accordance with the state of the data.

DESCRIPTION OF THE SEVENTH PREFERRED EMBODIMENT

Figure 10:
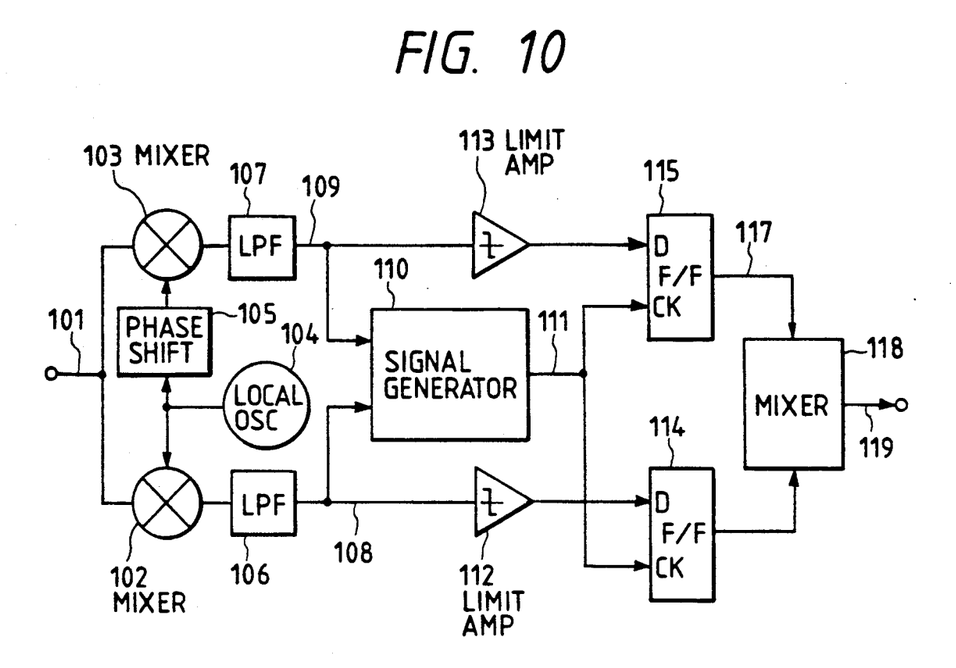
FIG. 10 is a block diagram of a data receiver according to a seventh embodiment of this invention.

With reference to FIG. 10, an input RF signal 101 is directly applied to a pair of mixers 102 and 103. The input RF signal 101 contains FSK signals on an RF carrier. Specifically, the input RF signal 101 has frequencies $fc \pm \delta$ where fc is the carrier frequency and $\delta$ is the FSK modulation deviation (the modulation frequency). A local oscillator 104 generates a signal corresponding to the RF carrier. The output signal from the local oscillator 104 is directly applied to the mixer 102. The output signal from the local oscillator 104 is transmitted via a 90-degree phase shifter 105 to the mixer 103. In this way, the mixers 102 and 103 are subjected to a pair of quadrature local oscillator signals respectively. The mixer 102 mixes the input RF signal 101 and one of the quadrature local oscillator signals. The mixer 103 mixes the input RF signal 101 and the other quadrature local oscillator signal.

The output signal of the mixer 102 is passed through a low pass filter 106, and thereby an in-phase baseband-frequency (or audio-frequency) signal 108 is extracted from the output signal of the mixer 102. The in-phase baseband-frequency signal is shortened to "the I signal". The output signal of the mixer 103 is passed through a low pass filter 107, and thereby a quadrature-phase baseband-frequency (or audio-frequency) signal 109 is extracted from the output signal of the mixer 103. The quadrature-phase baseband-frequency signal is shortened to "the Q signal".

The I signal 108 and the Q signal 109 are expressed by the previously-mentioned equations in the embodiment of FIGS. 1 and 2. The I signal 108 is free from any phase inversion responsive to a change in the sign of the modulation frequency. The Q signal 109 exhibits a phase inversion responsive to a change in the sign of the modulation frequency, and thus has information representing transmitted data. The I signal 108 and the Q signal 109 have substantially a quadrature relation.

The I signal 108 and the Q signal 109 are applied to a signal generator 110. The signal generator 110 produces a clock signal 111 on the basis of the I signal 108 and the Q signal 109. The clock signal 111 has a frequency essentially twice the frequency of the I signal 108 and has predetermined phase offsets with respect to the I signal 108 and the Q signal 109. For example, the signal generator 110 can be a combination of a frequency doubler acting on the I signal 108 and a delay circuit following the frequency doubler. In this case, the connection between the low pass filter 107 and the signal generator 111 is omitted.

The I signal 108 is applied to a limiting amplifier 112. The I signal 108 is wave-shaped by the limiting amplifier 112. The output signal from the limiting amplifier 112 is applied to a D terminal of a D-type flip-flop 114. A CK terminal of the flip-flop 114 receives the clock signal 111 from the signal generator 110. The flip-flop 114 samples the output signal from the limiting amplifier 112 in response to the clock signal 111, generating a signal 116 to be exposed to demodulation. The output signal 116 from the flip-flop 114 has a frequency essentially equal to the modulation frequency and is free from any phase inversion responsive to a change of the data.

The Q signal 109 is applied to a limiting amplifier 113. The Q signal 109 is wave-shaped by the limiting amplifier 113. The output signal from the limiting amplifier 113 is applied to a D terminal of a D-type flip-flop 115. A CK terminal of the flip-flop 115 receives the clock signal 111 from the signal generator 110. The flip-flop 115 samples the output signal from the limiting amplifier 113 in response to the clock signal 111, generating a signal 117 to be exposed to demodulation. The output signal 117 from the flip-flop 115 exhibits a phase inversion responsive to a change in the sign of the modulation frequency, and thus has information representing the transmitted data. The output signal 117 from the flip-flop 115 has a frequency essentially equal to the modulation frequency.

A phase relation between the output signals 116 and 117 from the flip-flops 114 and 115 changes between a same-phase state and an opposite-phase state in response to the state of the transmitted data. The output signals 116 and 117 from the flip-flops 114 and 115 are fed to a mixer 118 serving as a demodulator. The mixer 118 can be an EXCLUSIVE-OR gate. The signals 116 and 117 are mixed and combined by the mixer 118 into a data signal 119. In this way, the data are recovered from the input RF signal 1.

In general, an error in the operation of the phase shifter 105 decreases the phase accuracy of the I signal 108 and the Q signal 109. Such a decrease in the phase accuracy is compensated by the signal sampling processes which are performed by the flip-flops 114 and 115 using the frequency-doubled and phase-offset clock signal 111.

This embodiment may be modified by exchanging the I signal 108 and the Q signal 109. Specifically, in the modification, the I signal 108 is applied to the limiting amplifier 113 while the Q signal 109 is applied to the limiting amplifier 112.

DESCRIPTION OF THE EIGHTH PREFERRED EMBODIMENT

Figure 11:
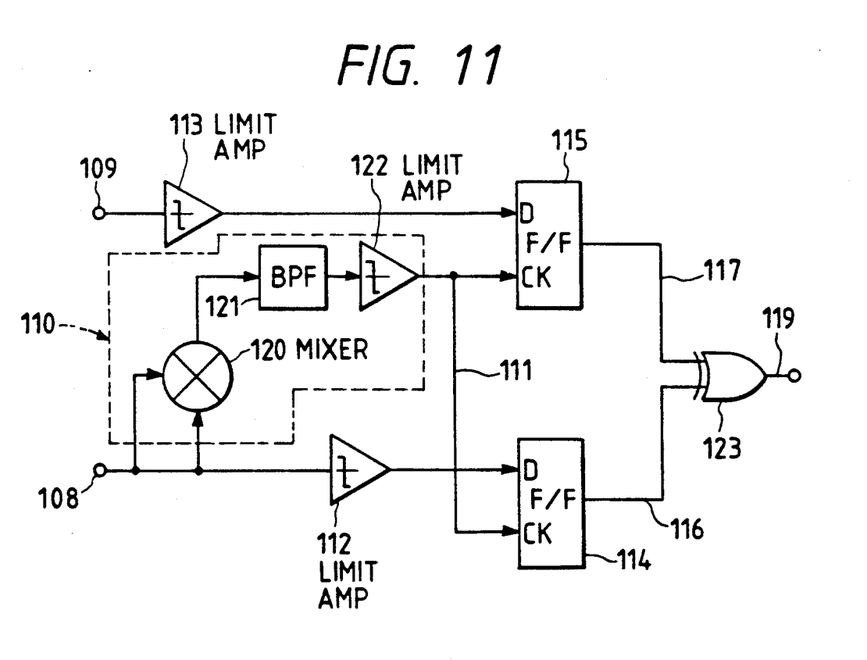
FIG. 11 is a block diagram of a data receiver according to an eighth embodiment of this invention.

FIG. 11 shows an eighth embodiment of this invention which is similar to the embodiment of FIG. 10 except for design changes indicated later. The eighth embodiment will now be explained with reference to FIGS. 11 and 12.

As shown in FIG. 11, the signal generator 110 includes a mixer 120, a band pass filter 121, and a limiting amplifier 122. Both input terminals of the mixer 120 are subjected to the I signal 108, and the I signal 108 undergoes a frequency doubling process in the mixer 120. Thus, the output signal from the mixer 120 has a component whose frequency is twice the frequency of the I signal 108. The output signal of the mixer 120 is applied to the band pass filter 121, and the frequency-doubled component of the output signal of the mixer 120 is selected by the band pass filter 121. The output signal from the band pass filter 121 is applied to the limiting amplifier 122, and is waved-shaped by the limiting amplifier 122 into the binary clock signal 111.

The output signals 116 and 117 from the flip-flops 114 and 115 are applied to respective input terminals of an EXCLUSIVE-OR gate 123. The EXCLUSIVE-OR gate 123 generates the data signal 119 on the basis of the signals 116 and 117.

Figure 12:
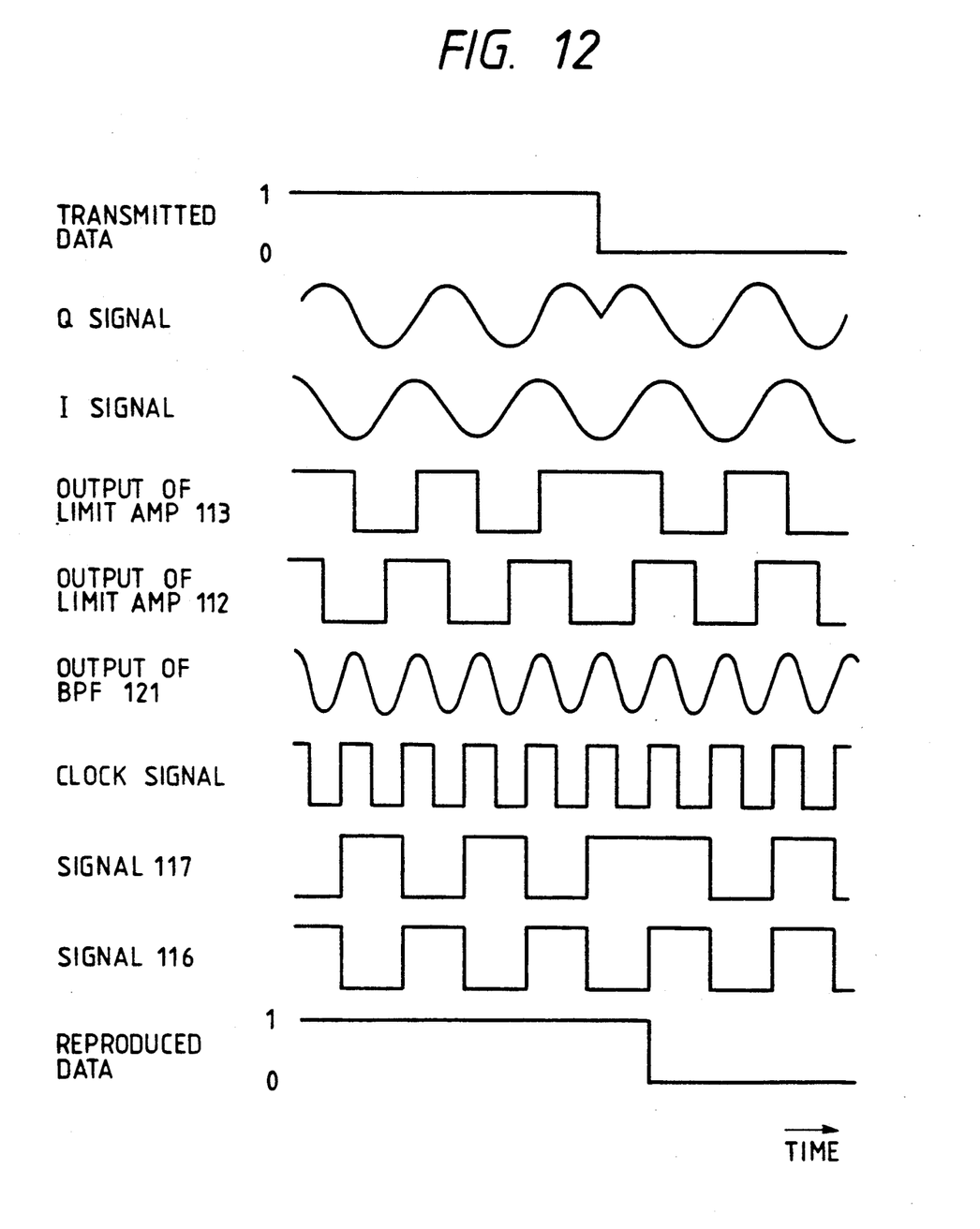
FIG. 12 is a timing diagram showing the waveforms of various signals in the data receiver of FIG. 11.

As shown in FIG. 12, the I signal 108 is free from any phase inversion responsive to a change of the data between "0" and "1" while the Q signal 109 changes in phase upon such a change of the data. Thus, the Q signal 109 has information representing the data. The I signal 108 and the Q signal 109 have substantially a quadrature phase relation.

As shown in FIG. 11, the I signal 108 is applied to a limiting amplifier 112, and the I signal 108 is shaped by the limiting amplifier 112 into a corresponding binary signal (see FIG. 12). The output signal from the limiting amplifier 112 is applied to a D terminal of the flip-flop 114.

The Q signal 109 is applied to a limiting amplifier 113, and the Q signal 109 is shaped by the limiting amplifier 113 into a corresponding binary signal (see FIG. 12). The output signal from the limiting amplifier 113 is applied to a D terminal of the flip-flop 115.

As shown in FIG. 12, the frequency of the output signal from the band pass filter 121 is twice the frequency of the I signal 108. The limiting amplifier 122 shapes the output signal of the band pass filter 121 into a corresponding binary clock signal 111. The frequency of the clock signal 111 is twice the frequency of the I signal 108. The clock signal 111 has a predetermined phase offset with respect to the I signal 108.

The flip-flop 114 samples the output signal of the limiting amplifier 112 at a timing determined by the clock signal 111, generating a signal 116 free from any phase inversion responsive to a change of the state of the data. The frequency of the output signal 116 from the flip-flop 114 is essentially equal to the modulation frequency.

The flip-flop 115 samples the output signal of the limiting amplifier 113 at a timing determined by the clock signal 111, generating a signal 117 which exhibits a phase inversion responsive to a change of the state of the data. Thus, the output signal 117 from the flip-flop 115 has information representing the data. The frequency of the signal 117 is essentially equal to the modulation frequency.

As shown in FIG. 12, the phase relation between the output signals 116 and 117 from the flip-flops 114 and 115 changes between a same-phase state and an opposite-phase state in accordance with the state of the data. As shown in FIG. 11, these signals 116 and 117 are fed to the EXCLUSIVE-OR gate 123. The EXCLUSIVE-OR gate 123 generates reproduced data on the basis of the output signals 116 and 117 from the flip-flops 114 and 115. The reproduced data well agrees with the transmitted data although the reproduced data has a given time lag relative to the transmitted data.

DESCRIPTION OF THE NINTH PREFERRED EMBODIMENT

Figure 13:
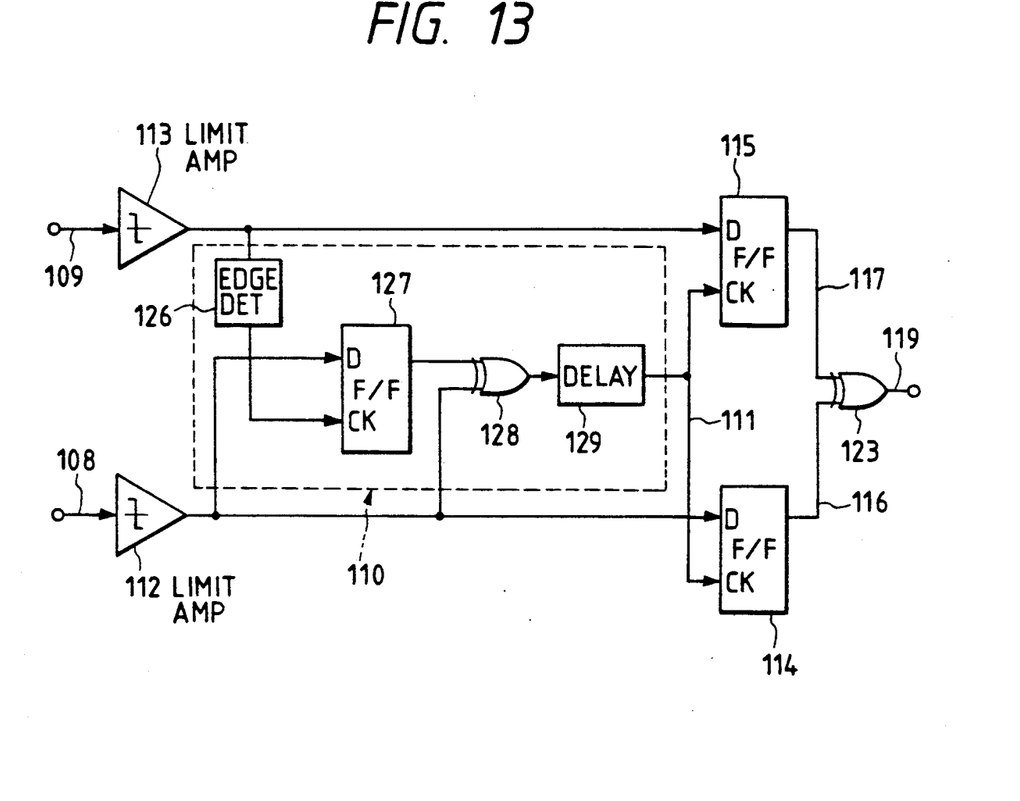
FIG. 13 is a block diagram of a data receiver according to a ninth embodiment of this invention.

FIG. 13 shows a ninth embodiment of this invention which is similar to the embodiment of FIGS. 11 and 12 except for design changes indicated later. The ninth embodiment will now be explained with reference to FIGS. 13 and 14.

Figure 14:
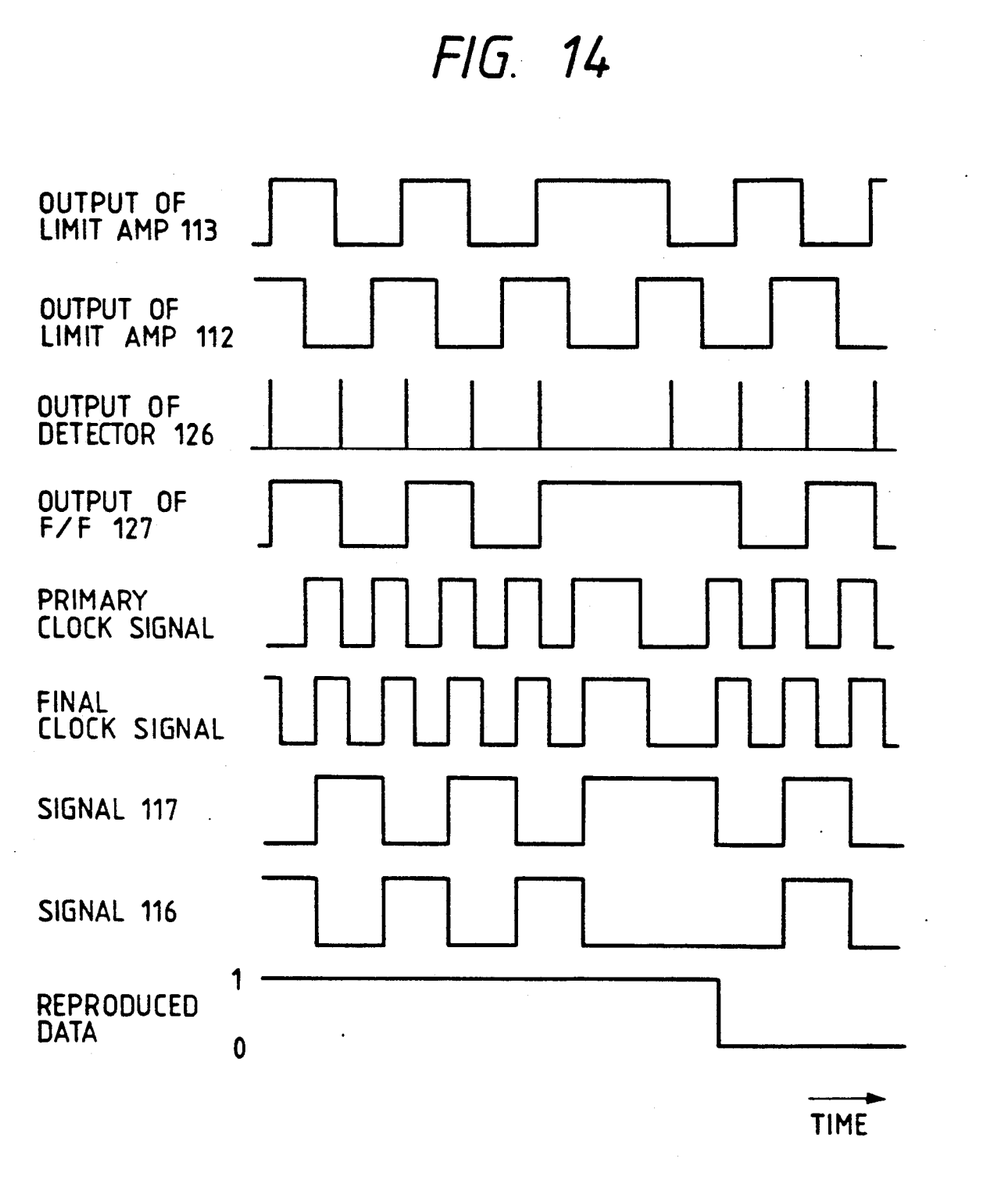
FIG. 14 is a timing diagram showing the waveforms of various signals in the data receiver of FIG. 13.

As shown in FIG. 13, the signal generator 110 includes a both-edge detector 126, a D-type flip-flop 127, an EXCLUSIVE-OR gate 128, and a delay circuit 129. The output signal from the limiting amplifier 112 is applied to a D terminal of the flip-flop 127. The output signal from the limiting amplifier 113 is applied to the both-edge detector 126. The both-edge detector 126 detects positive-going and negative going edges in the output signal of the limiting amplifier 113, and outputs a signal containing short pulses which concur with the edges in the output signal of the limiting amplifier 113 as shown in FIG. 14. The output signal from the both-edge detector 126 is applied to a CK terminal of the flip-flop 127. The output signal from the both-edge detector 126 serves as a clock signal in a sampling process executed by the flip-flop 127. The flip-flop 127 samples the output signal of the limiting amplifier 112 in response to each pulse of the output signal from the both-edge detector 126, and thereby outputs a signal having a waveform shown in FIG. 14.

The output signal from the flip-flop 127 is applied to a first input terminal of the EXCLUSIVE-OR gate 128. The output signal from the limiting amplifier 112 is applied to a second input terminal of the EXCLUSIVE-OR gate 128. The EXCLUSIVE-OR gate 128 generates a primary clock signal on the basis of the output signals from the devices 110 and 112. As shown in FIG. 14, the primary clock signal, that is, the output signal from the EXCLUSIVE-OR gate 128 has a frequency twice the frequency of the I signal 108 or the output signal from the limiting amplifier 112. The primary clock signal is delayed by the delay circuit 129 by a predetermined time, so that the primary clock signal is converted into a final clock signal 111. The final clock signal 111 is applied to flip-flops 114 and 115. The delay circuit 129 enables the final clock signal 111 to have predetermined phase offsets with respect to the output signals from the limiting amplifiers 112 and 113.

The output signals from the limiting amplifiers 112 and 113 are sampled by the flip-flops 114 and 115 in response to the final clock signal 111, and are thereby converted into the signals 116 and 117. The output signals 116 and 117 from the flip-flops 114 and 115 are applied to respective input terminals of an EXCLUSIVE-OR gate 123. The EXCLUSIVE-OR gate 123 generates the data signal 119 on the basis of the signals 116 and 117.

What is claimed is:

1. A data receiver comprising:
   first and second mixers mixing an input RF signal and a local oscillator signal and generating first and second quadrature baseband-frequency output signals;
   a phase shifter shifting the phase of the first baseband frequency output signal by 90 degrees;
   a third mixer mixing an output signal from the phase shifter and the first baseband-frequency output signal;
   a fourth mixer mixing the first and second baseband-frequency output signals; and
   a demodulator performing data demodulation by use of output signals from the third and fourth mixers.

2. The data receiver of claim 1 wherein the demodulator comprises a fifth mixer mixing the output signals from the third and fourth mixers.

3. The data receiver of claim 1 wherein the demodulator comprises an adding amplifier adding the output signals from the third and fourth mixers, a subtracting amplifier performing subtraction between the output signals from the third and fourth mixers, and a detector performing detection by use of output signals from the adding amplifier and the subtracting amplifier.

4. The data receiver of claim 1 wherein the third mixer comprises an exclusive OR gate and the fourth mixer comprises an exclusive OR gate.

5. A data receiver comprising:
   first and second mixers mixing an input RF signal and a local oscillator signal and generating first and second quadrature baseband-frequency output signals;
   means for branching the first baseband frequency output signal into first and second parts;
   a third mixer mixing the first and second parts of the first baseband-frequency output signals;
   a fourth mixer mixing the first and second baseband-frequency output signals;
   a phase shifter shifting the phase of the output signal from the third mixer by 90 degrees;
   a fifth mixer mixing an output signal from the phase shifter and the output signal from the third mixer;
   a sixth mixer mixing the output signal from the third mixer and an output signal from the fourth mixer; and
   a demodulator performing data demodulation by use of output signals from the fifth and sixth mixers.

6. The data receiver of claim 5 wherein the demodulator comprises a seventh mixer mixing the output signals from the fifth and sixth mixers.

7. The data receiver of claim 5 wherein the demodulator comprises an adding amplifier adding the output signals from the fifth and sixth mixers, a subtracting amplifier performing subtraction between the output signals from the fifth and sixth mixers, and a detector performing detection by use of output signals from the adding amplifier and the subtracting amplifier.

8. A data receiver comprising:
   first and second mixers mixing an input RF signal and a local oscillator signal and generating first and second quadrature baseband-frequency output signals;
   a first phase shifter shifting the phase of the second baseband-frequency output signal by 90 degrees;
   a third mixer mixing the first baseband-frequency output signal and an output signal from the first phase shifter;
   a fourth mixer mixing the second baseband-frequency output signal and the output signal from the first phase shifter;
   a second phase shifter shifting the phase of an output signal from the third mixer by 90 degrees;
   a fifth mixer mixing an output signal from the second phase shifter and the output signal from the third mixer;
   a sixth mixer mixing the output signal from the third mixer and an output signal from the fourth mixer; and
   a demodulator performing data demodulation by use of output signals from the fifth and sixth mixers.

9. The data receiver of claim 8 wherein the demodulator comprises a seventh mixer mixing the output signals from the fifth and sixth mixers.

10. The data receiver of claim 8 wherein the demodulator comprises an adding amplifier adding the output signals from the fifth and sixth mixers, a subtracting amplifier performing substraction between the output signals from the fifth and sixth mixers, and a detector performing detection by use of output signals from the adding amplifier and the subtracting amplifier.

11. A data receiver for an RF FSK signal containing data, comprising;
    means for generating first and second quadrature baseband-frequency signals on the basis of the RF FSK signal;
    means for converting the first and second baseband-frequency signals into third and fourth baseband-frequency signals, wherein the third and fourth baseband-frequency signals have a frequency which essentially equals a predetermined multiple of a frequency of the first and second baseband frequency signals, and wherein the third and fourth baseband-frequency signals have a phase relation dependent upon received data; and means for recovering the data from the third and fourth baseband-frequency signals.

12. A data receiver comprising:

first and second mixers mixing an input RF signal and a local oscillator signal and generating first and second quadrature baseband-frequency output signals;

means for generating a clock signal on the basis of at least the first baseband-frequency output signal, wherein the clock signal has a frequency essentially twice a frequency of the first baseband-frequency output signal and has a predetermined phase offset with respect to the first baseband-frequency output signal;

a first D-type flip-flop having a D input terminal subjected to the first baseband-frequency output signal and a clock input terminal subjected to the clock signal;

a second D-type flip-flop having a D input terminal subjected to the second baseband frequency output signal and a clock input terminal subjected to the clock signal, and wherein output signals from the first and second flip-flops have a phase relation dependent upon the input RF signal; and a third mixer mixing output signals from the first and second flip-flops.

13. The data receiver of claim 12 wherein the third mixer comprises an EXCLUSIVE-OR gate.

14. The data receiver of claim 12 wherein the clock-generating means comprises means for branching the first baseband-frequency output signal into first and second parts, a fourth mixer mixing the first and second parts of the first baseband-frequency output signals, a band pass filter connected to the fourth mixer and selecting a component of an output signal from the fourth mixer, wherein the component has a frequency essentially twice the frequency of the first baseband-frequency output signal, and a limiting amplifier limiting an amplitude of an output signal from the band pass filter and deriving the clock signal.

15. The data receiver of claim 12 wherein the clock-generating means comprises a first limiting amplifier limiting an amplitude of the first baseband-frequency output signal, a second limiting amplifier limiting an amplitude of the second baseband-frequency output signal, a both-edge detector detecting positive-going and negative-going edges in an output signal from the second limiting amplifier, a third D-type flip-flop having a D input terminal subjected to an output signal from the first limiting amplifier and a clock input terminal subjected to an output signal from the both-edge detector, an EXCLUSIVE-OR gate having first and second input terminals subjected to an output signal from the third flip-flop and the output signal from the first limiting amplifier, and a delay circuit delaying an output signal from the EXCLUSIVE-OR gate and deriving the clock signal.

16. A data receiver for an RF FSK signal containing data, comprising:

means for generating first and second quadrature baseband-frequency signals on the basis of the RF FSK signal;

means for generating a clock signal which has predetermined phase offsets with respect to the first and second baseband-frequency signals respectively;

means for sampling the first baseband-frequency signal in response to the clock signal to convert the first baseband-frequency signal into a corresponding first sample signal;

means for sampling the second baseband-frequency signal in response to the clock signal to convert the second baseband-frequency signal into a corresponding second sample signal, and wherein the first and second sample signals have a phase relation dependent upon data; and means for recovering the data from the first and second sample signals.

17. A data receiver comprising:

first and second mixers mixing an input RF signal and a local oscillator signal, and generating first and second quadrature baseband-frequency signals, respectively;

a phase shifter shifting the phase of the first baseband-frequency signal by 90°;

a first limiting amplifier limiting the amplitude of the first baseband-frequency signal;

a second limiting amplifier limiting the amplitude of the second baseband-frequency signal;

a third limiting amplifier limiting the amplitude of an output signal from the phase shifter;

a third mixer mixing an output signal from the third limiting amplifier and an output signal from the first limiting amplifier;

a fourth mixer mixing the output signal from the first limiting amplifier and an output signal from the second limiting amplifier; and a demodulator performing data demodulation by use of output signals from the third and fourth mixers.

18. The data receiver of claim 17 wherein the third mixer comprises and exclusive OR gate and the fourth mixer comprises an exclusive OR gate.

* * * * *